Sept. 15, 1959  A. A. MARKSON  2,904,075
PILOT ASSEMBLIES INCLUDING A LOW PRESSURE VALVE
AND A HIGH PRESSURE VALVE ACTUATED BY A
PISTON IN THE LOW PRESSURE VALVE
Filed July 13, 1953  2 Sheets-Sheet 1
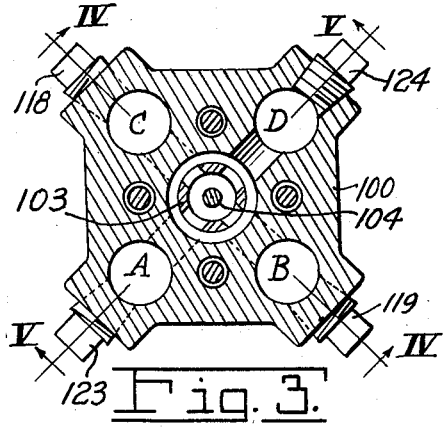
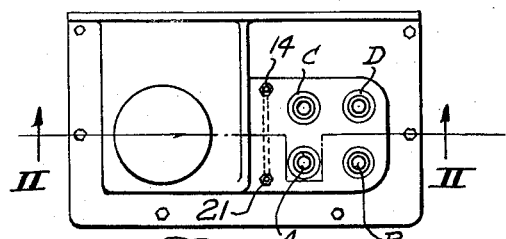
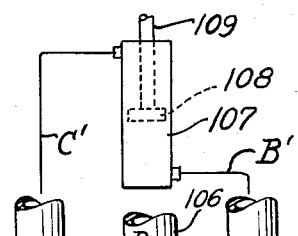
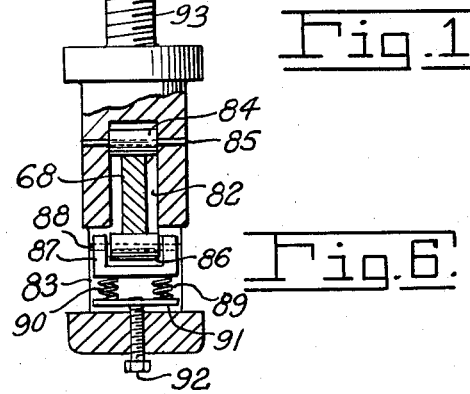
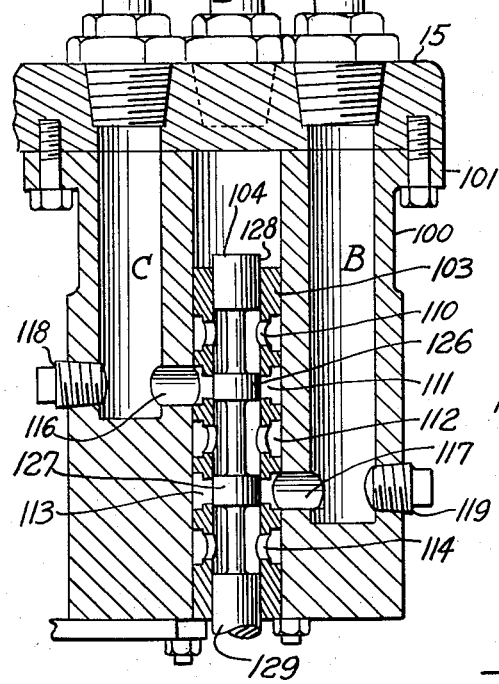
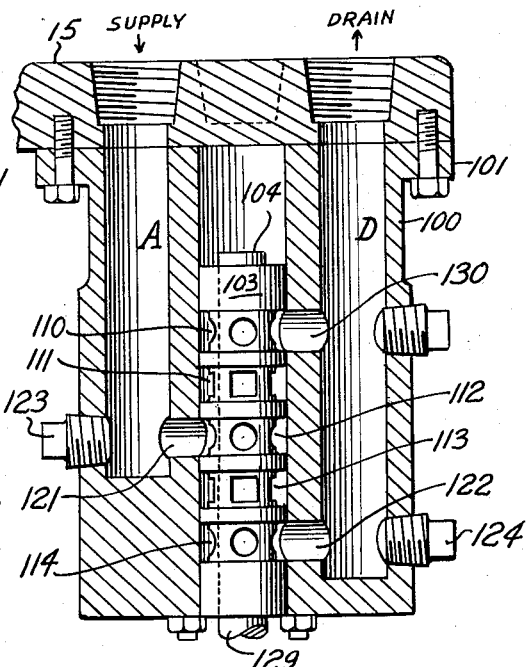
INVENTOR.
ALFRED A. MARKSON
BY
Zugelter & Zugelter
Attys.

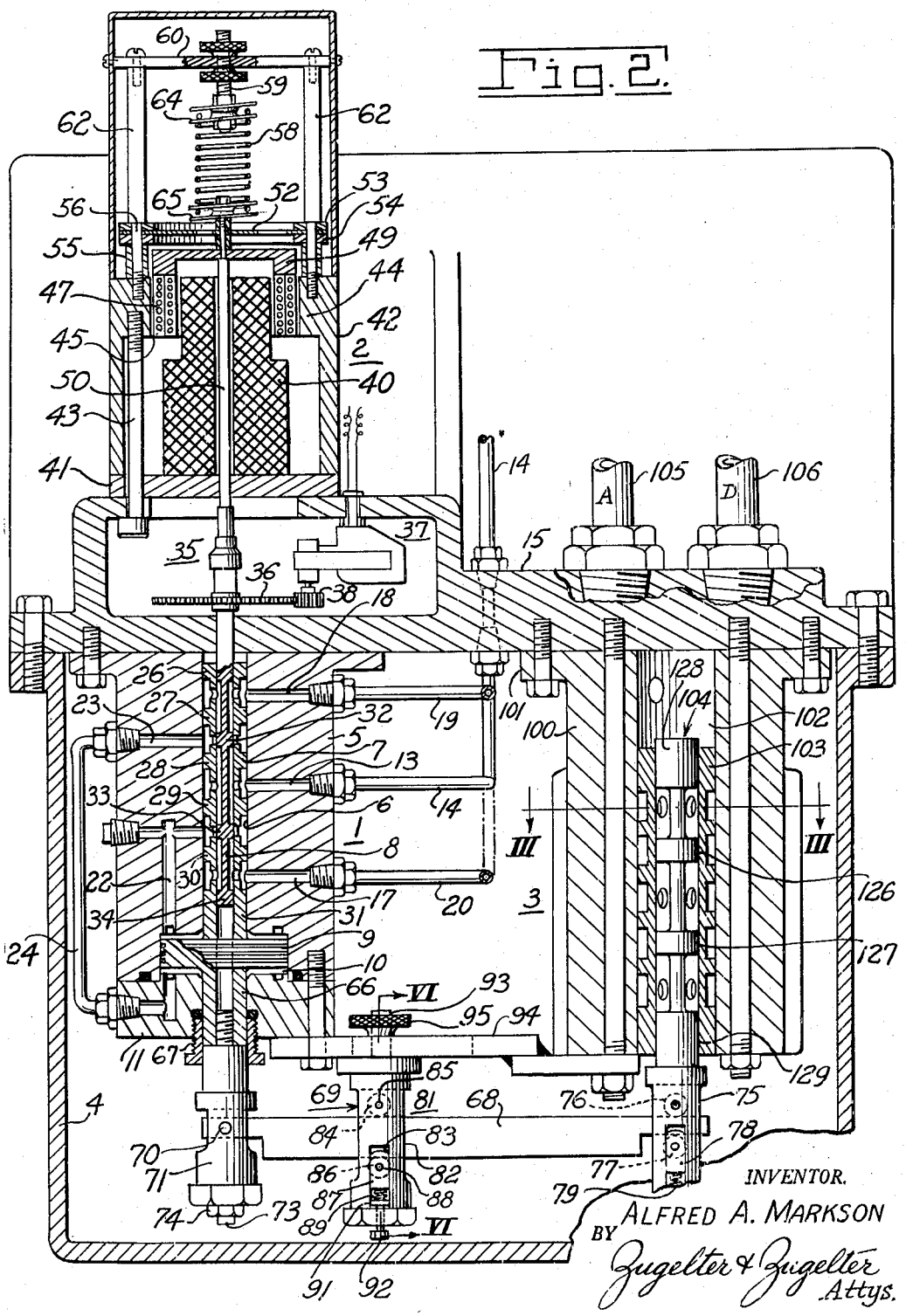

United States Patent Office 2,904,075
Patented Sept. 15, 1959

2,904,075

PILOT ASSEMBLIES INCLUDING A LOW PRESSURE VALVE AND A HIGH PRESSURE VALVE ACTUATED BY A PISTON IN THE LOW PRESSURE VALVE

Alfred A. Markson, Mount Lebanon Township, Allegheny County, Pa., assignor to Hagan Chemicals & Controls, Inc., a corporation of Pennsylvania Application July 13, 1953, Serial No. 367,671

1 Claim. (Cl. 137—622)

This invention relates to pilot valve mechanisms and more particularly to pilot valve mechanisms that have a sensitive response to input, are fast-moving and have great output transmission capacity relative to the input.

An object of this invention is to provide a pilot valve mechanism that embodies a sensitive, quick-acting primary pilot valve, and a quick-acting secondary pilot valve having a large transmitting or output capacity relative to the primary valve, and that is actuated by the primary valve mechanism.

Another object of this invention is to provide a mechanism as above set forth, that includes means for spinning the valve stem of the primary valve mechanism to render it substantially frictionless to movement, a sleeve in which the stem operates and a piston controlled by the stem for moving the sleeve relative to the stem in a direction to return the valve to neutral position.

A still further object of the invention is to provide a valve mechanism as set forth in the next preceding object, whereby the secondary pilot valve is actuated by the piston through a fulcrumed lever.

A further object of the invention is to provide a pilot valve mechanism as set forth above, in which the valve stem of the primary pilot valve is actuated by a coil winding adapted to receive variable input electric currents, and which are disposed in a strong magnetic field.

The above and other objects of the invention will be apparent to those of ordinary skill in the art to which this invention pertains, from the following description and drawings.

In the drawings:

Figure 1 is a top plan assembly view, to a reduced scale, of a pilot valve mechanism arranged and constructed in accordance with an embodiment of the invention;

Fig. 2 is an enlarged view in section, taken on line II—II of Fig. 1;

Fig. 3 is a view in section taken on line III—III of Fig. 2;

Fig. 4 is a view in section taken on line IV—IV of Fig. 3;

Fig. 5 is a view in section taken on line V—V of Fig. 3; and

Fig. 6 is a view, partially in section, taken on line VI—VI of Fig. 2.

In the drawings, and particularly with reference to Fig. 2, is illustrated a pilot valve mechanism comprising a primary pilot valve 1 of the compensated or follow-up type, which is actuated by an electro-magnetic input device 2, and an output pilot valve 3, that is actuated by the pilot valve mechanism 1. Pilot valve 1 and output pilot valve 3 are disposed in a housing 4.

Pilot valves 1 and 3 each have a neutral position. When valve 1 is actuated out of neutral, a component of valve 1 returns valve 1 to neutral at the same time actuating valve 3 out of neutral, but is returned to neutral when the input to device 2 is at a predetermined value.

Valve 1 comprises a body 5, having a central bore 6 therein. A sleeve 7 is slidably disposed within the bore 6, and a pilot valve stem 8 is slidably and rotatably mounted in the bore of sleeve 7. One end of sleeve 7 is provided with a piston 9, that operates in a cylinder 10 in the body 5. Cylinder 10 is closed by a head 11, bolted to the body 5.

The body 5 is provided with a supply port 13, to which a supply pipe 14 is connected. The supply pipe 14 extends through a cap or cover 15 of the case or container 4. The body is also provided with exhaust ports 17 and 18, and these are connected by pipes 19 and 20 which, in turn, are connected to a pipe 21 leading through the top of the case. The supply pipe 14 may be connected to a supply of operating fluid, such as oil or air, and pipe 21 may be connected to a sump (not shown) in the case oil is used, to be returned by a pump (not shown) to the supply pipe 14.

The body 5 is provided with an outlet port 22, that leads to cylinder 10 at the top of piston 9, and an outlet port 23, that is connected by a pipe 24 to the cylinder 10 at the under side of piston 9.

Sleeve 7 is provided with a plurality of spaced lands 26, 27, 28, 29, 30 and 31, that provide annular spaces which are separated from one another, and which communicate with the respective inlet port 13, the drain ports 17 and 18, and the outlet ports 22 and 23, as shown. The sleeve 7 is ported at the locations between the respective pairs of lands 26, 27, 27, 28, 28, 29, 29, 30, 30 and 31, as shown, to provide communication between the inlet, outlet and drain ports of the body with the interior or bore of sleeve 7, as shown.

The ports in the sleeve 7 that communicate with the annular space between lands 26 and 27, lead to the drain port 18. The ports in the sleeve between the lands 27 and 28 communicate with the outlet port 23. The ports in the sleeve between lands 28 and 29 communicate with the supply port 13. The ports in the sleeve between lands 29 and 30 communicate with the outlet port 22, and the ports in the sleeve between lands 30 and 31 communicate with the drain port 17.

The valve stem 8, as shown, is slidably disposed in the ported bore of sleeve 7, and the stem is provided with lands 32 and 33, that control the sleeve ports which communicate with the outlet ports 22 and 23. The valve stem is also provided with a land 34 at its lower end, that is located below the ports communicating with the space between the lands 30 and 31 of the sleeve. The upper end of the valve stem is enlarged, and its diameter is equal to the diameter of lands 32, 33 and 34, and forms a seal at the upper end of the bore in sleeve 7.

The valve stem 8 extends upwardly through the cover 15 of the case, and is connected to an anti-friction bearing 35. Below the anti-friction bearing 35 is a gear 36, by means of which the valve stem may be rotated continuously while the valves are in operation. The gear 36 may be driven by an electric motor 37, having a pinion 38 on the motor shaft thereof. The valve stem 8 is actuated along the bore of sleeve 7 by electro-magnetic device 2, all the while the valve stem 8 is rotating or spinning.

The electro-magnetic device 2 comprises a strong permanent magnet 40, mounted with a magnetic circuit comprising a base 41 and a cylinder 42, which are secured together on the cover 15 of the case, as shown, by means of bolts 43. Cylinder 42 is provided at its upper end with an inwardly-projecting annular pole piece 44. There is a gap 45 between the pole piece 44 and the upper end of the core 40. A coil winding 47, comprising two input coils 47a and 47b, is disposed in the gap 45, and secured to a support member 49, from which the anti-friction coupling 35, gear 36, and the valve stem 8 are suspended by a rod 50 of non-magnetic material. As shown, the rod 50 extends through a central bore in the core 40. The coil windings 47a and 47b and the support 49 therefor, are suspended from a resilient spring 52 of the flat spiral type employed in microphones, for example. The marginal edge of that spring is clamped between clamp rings 53 and 54. The clamp rings 53 and 54 are mounted on spacer ring 55, that rests on the top of the cylinder 42. Screws 56 are employed to clamp the rings 53 and 54 together, and also to secure that assembly to the top of the cylindrical core 42.

The dead weight of the pilot valve stem 8, the gear 36, its coupling 35 and the rod 50, is carried by a spring 58, the upper end of which is suspended by a screw 59 from a cross piece 60 mounted on uprights 62 which, for convenience, may be integral with the screws 56. The screw 59 may be provided with a traveling nut 64, which is adapted to be screwed into the spring 58 in order to increase or decrease the number of active turns of the spring 58. The lower end of the spring is connected to a similar nut 65, secured to the rod 50. When a variable input of electric current is supplied coil windings 47a and 47b, valve stem 8 will be moved upwardly or downwardly, depending upon the relative values of the inputs to the respective windings 47a and 47b.

The pilot valve stem 8 and sleeve 7 are shown in Fig. 2 in neutral position; that is, there is no output from either the outlet ports 22 or 23. While in neutral position, the pressure of the supply fluid on the opposite faces of piston 9 are equal; thus, the piston is locked in that position. If the valve stem is raised upwardly from the neutral position, port 23 is placed in communication with the inlet port 13, and port 22 is placed in communication with the drain port 17. Under these conditions, fluid pressure is conveyed to the under side of piston 9, whereby sleeve 7 is moved upwardly to a position where the valve stem is again in neutral. When the valve stem 8 is moved downwardly from the neutral position, outlet port 22 is placed in communication with the supply port 13, and the outlet port 23 is placed in communication with the exhaust port 18. Therefore, fluid pressure will be admitted to the top side of piston 9, while fluid is exhausted from the under side thereof through ports 23 and 18, and the drain pipe 19. When this occurs, the piston moves downwardly until the ports in the sleeve are closed by lands 32 and 33, respectively.

The sleeve 7 is provided with an extension 66 from the under side of piston 9, that passes outwardly through a gland 67 in the head 11. The extension 66 is connected to output pilot valve 3 by means of a lever 68 and a fulcrum 69. The left-hand end of lever 68 is connected by a pin 70 to a yoke 71, through which the left-hand end of the lever extends. The yoke 71 is secured to the lower end of the valve sleeve extension 66 by means of a stud bolt 73 and a lock nut 74.

The opposite end of lever 68 is connected to the pilot valve 3 by means of a yoke 75, similar in construction to the yoke shown in Fig. 6. The yoke 75 is provided with a roller 76, that bears across the top side of lever 68, and a roller 77 that engages the under side of lever 68. Roller 77 is mounted in a slidable support 78, mounted in the yoke 75, and, which is urged upwardly into engagement with the under side of the lever 68, by a spring 79. Thus, the end of the lever, which is connected to yoke 75, may move up or down without binding the lever, because of the relative increase or decrease in the distance from the point of bearing of rollers 76 and 77 on lever 68, to the point of action of the fulcrum 69.

Fulcrum 69 comprises a yoke 81 having a slot 82 therein, to accommodate lever 68, and a slot 83 located below the beam and transversely of the slot 82. A fulcrum roller 84 is mounted in the top of slot 83, on a pin 85. The roller 84 extends transversely of the lever 68, as shown. In order to maintain the lever 68 in contact with the fulcrum roller when the beam is turned clockwise, a roller 86 is provided. Roller 86 engages lever 68 on the under side thereof, and is mounted in a clevis 87 on a pin 88. The clevis 86 is supported on springs 89 and 90, that rest on a thrust plate 91. The thrust plate is connected to a screw 92, extending upwardly through the bottom of the yoke, whereby the initial tension exerted by springs 89 and 90 on roller 86 may be adjusted. By means of a fulcrum so constructed, the beam turns on roller 86 when it is being turned clockwise by piston 9, and bears against roller 84 when it is being rotated counter-clockwise by said piston. The yoke 81 is provided with a stud 93 at the top thereof, that extends upwardly through a support plate 94, secured to the bottom of valve body 1 and valve 3, as shown. A thumb nut 95 may be used to secure the yoke to the support plate 94.

Output pilot valve 3 comprises a body 100 having a flange 101 at its upper end, by means of which it may be secured to the cover 15. The body has a main bore 102, in which a sleeve 103 is mounted with a press fit, and a pilot valve stem 104 that is connected at its lower end to the yoke 75. The body 100 is provided with a plurality of ports A, B, and C, D, that are parallel to the central bore 102. Bore A may be considered the supply bore and, as shown in Fig. 2, is connected to a supply pipe 105, while bore D may be considered as a drain bore, and is connected to a drain pipe 106. The valve 3, as illustrated, is of the type intended to be used with hydraulic fluid. Therefore, pipe 105 would be supplied by a pressure pump, and pipe 106 would lead back to the sump of that pump for re-circulation to the supply pipe 105. The body 100 is also provided with bores B and C, spaced as shown in Fig. 3. Bores B and C are outlets, and would be connected to outlet pipes which serve the opposite ends of an hydraulic cylinder, or other hydraulically-operated motor, having a reciprocating power-transmitting element therein. Thus, as shown in Fig. 4, bores B and C are connected by pipes B' and C' to the opposite ends of a power cylinder 107, for example, in which is a piston 108 provided with a piston rod 109.

Sleeve 103 is provided with a plurality of exterior annular grooves 110, 111, 112, 113 and 114, spaced uniformly along the length thereof. The inner wall of these annular grooves 110 to 114, inclusive, are ported so as to place the interior of the sleeve 103 in communication with them. As shown in Fig. 4, body bores A and B are provided with lateral passageways 116 and 117, respectively, that communicate with the annular grooves 111 and 113. The lateral passageways 116 and 117 are formed by drilling from the outside of the body through the body wall and the bores A and B. The outer ends of these lateral bores are closed by screw plugs 118 and 119. As shown in Fig. 5, bores C and D are connected by lateral passageways 121 and 122, that provide communication between bore C and annular groove 112, and bore D and annular groove 113, respectively. Passageways 121 and 122 are formed by drilling laterally through the body from the outside thereof, into the main bore 101. The outer end of these passageways are closed by means of screw plugs 123 and 124.

The valve stem 104 is provided with spaced lands 126 and 127, that control the ports communicating with the annular grooves 111 and 113. The upper end of the stem is provided with an elongated land 128 that closes the upper end of the sleeve 103. The lower end of the stem is enlarged, as at 129, to close the lower end of the sleeve 103.

When the valve stem 104 is in the position shown in Figs. 2, 4 and 5, it is in neutral position, and communication between the supply bore A and the outlet bores B and C is shut off by lands 126 and 127. If the valve stem is moved upwardly from the position shown in these views, the supply bore A is placed in communication with outlet bore C through annular space 111 and passageway 116. At the same time, outlet bore B is placed in communication with drain bore D through annular grooves 113 and 114 and passageway 122. In that case, fluid pressure would be supplied to the upper end of cylinder 107, causing the piston 108 to move downwardly. At the same time, hydraulic fluid below the piston 108 is exhausted through the annular grooves 113 and 114, and passageway 122 and drain bore D. When pilot valve stem 104 moves downwardly from the position shown in the drawing, the supply bore A is placed in communication with outlet bore B through annular grooves 112 and 113 and passageway 117. In that case, fluid pressure is supplied to the lower end of cylinder 107 by pipe B', causing the piston 108 to move upwardly. When the piston 108 is moving upwardly, the upper end of the cylinder 107 exhausts through pipe C', annular spaces 111 and 110 and side passage 130 into bore D. Thus, bore D serves as the exhaust bore for both ends of cylinder 107.

As will be understood by those skilled in this art, the pilot valve stem 8 is actuated by the electro-magnetic means 2 in response to a variable input to coils 47a and 47b. As the valve stem 8 is operated, piston 9 of sleeve 7 actuates the output pilot valve 3 to effect a supply of operating fluid to a positioning device, such as the power cylinder 107, through one or the other of the outlet ports B and C. When the pilot valve stem has moved to effect movement of the sleeve piston 9, the ports in the sleeve 7 are returned to neutral, whereby the valve stem of the output pilot valve 3 is also returned to neutral. If the position to which the piston 108 was actuated in response to movement of the pilot valve stem 104 does not restore the input condition to the electro-magnetic device 2, to the desired value, the pilot valve stem 8 will again move to effect further movement of cylinder 108 in a corrective direction. Thus, the pilot valve 1 will operate step by step in the direction indicated and required by the input to the electro-magnetic device 2, with corresponding operation of the main or output pilot valve 3. Pilot valve 3 will come to neutral position when stem 8 and sleeve 9 are in mid position with reference to the stroke of piston 9.

Since the valve stem 8 of valve 1 is spinning continuously, it is substantially friction-free in its longitudinal movement within the sleeve 7. The pilot valve 1 is therefore sensitive to inputs. The output of the valve 1 is magnified by piston 9, which acts as a follow-up or compensating mechanism, and also as the actuating mechanism of the output pilot valve 3. Thus, it is possible to utilize relatively small inputs to the magnetic device 2, and comparatively small inputs and outputs from the pilot valve 1 to produce motion in the valve stem 104 of the large capacity, heavy duty, output pilot valve 3.

As shown in Fig. 2, the fulcrum 81 may be moved lengthwise of the lever 68. By adjusting the fulcrum lengthwise of the beam 67, the ratio of input to the pilot valve 1, to the output of the output valve 3, may be adjusted from a ratio of 1 to 1, to ratios greater than 1 to 1, or less than 1 to 1.

Having thus described the invention, it will be apparent to those of ordinary skill in the art to which it pertains, that various modifications and changes may be made in the illustrated embodiment without departing from either the spirit or the scope of the invention.

Therefore, what is claimed as new and desired to be secured by Letters Patent is:

A condition responsive control element actuated compensated pilot valve and an operator mechanism comprising a valve body having a cylindrical valve bore therein and a cylinder at one end of the bore in axial alignment therewith, said body having an inlet port, spaced drain ports, spaced outlet ports and passageways connecting said outlet ports to opposite ends of said cylinder, a sleeve in said body bore and slidably therealong and a piston in said cylinder coupled to said sleeve, said sleeve having a bore coaxial with the body bore, a spinable valve stem in said sleeve adapted to be actuated along said bore by a condition responsive control element, means for continuously spinning said value stem, the stem being provided with lands for controlling communications between said body inlet port and said outlet ports and between said outlet ports and the drain ports, the outlet ports to said cylinder being so connected that the piston always actuates the sleeve in the same direction as that in which the stem is actuated so as always to tend to position the stem in a position to close said outlet ports, and an operator mechanism connected to said piston for actuation thereby.

References Cited in the file of this patent

UNITED STATES PATENTS

| 420,801 | Hultgren | Feb. 4, 1890 |
| 477,055 | Kieckhefer | June 14, 1892 |
| 1,957,759 | Coates | May 8, 1934 |
| 1,962,676 | Albright | June 12, 1934 |
| 1,967,851 | Wilson | July 24, 1934 |
| 1,972,852 | Albright | Sept. 11, 1934 |
| 1,976,659 | Dickinson | Oct. 9, 1934 |
| 1,987,508 | Edler | Jan. 8, 1935 |
| 2,111,659 | Benedek | Mar. 22, 1938 |
| 2,304,784 | Donaldson | Dec. 15, 1942 |
| 2,381,312 | Rodal | Aug. 7, 1945 |
| 2,518,925 | Nussbaum | Aug. 15, 1950 |
| 2,538,605 | Udale | Jan. 16, 1951 |
| 2,634,747 | Markson | Apr. 14, 1953 |
| 2,639,721 | Strief | May 26, 1953 |
| 2,644,427 | Sedgfield | July 7, 1953 |
| 2,670,715 | Conway | Mar. 2, 1954 |
| 2,761,517 | Detamore | Sept. 4, 1956 |
| 2,780,917 | Lamond | Feb. 12, 1957 |

FOREIGN PATENTS

| 354,048 | Germany | June 1, 1922 |
| 399,682 | Great Britain | 1933 |